US009560649B1

(12) United States Patent
Chindapol et al.

(10) Patent No.: US 9,560,649 B1
(45) Date of Patent: Jan. 31, 2017

(54) METHOD OF ALLOCATING COMMUNICATION RESOURCES TO A WIRELESS DEVICE IN A WIRELESS COMMUNICATION NETWORK

(71) Applicant: Sprint Spectrum LP, Overland Park, KS (US)

(72) Inventors: Aik Chindapol, Washington, DC (US); Muhammad Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 93 days.

(21) Appl. No.: 14/209,389

(22) Filed: Mar. 13, 2014

(51) Int. Cl.
*H04L 12/24* (2006.01)
*H04W 72/04* (2009.01)

(52) U.S. Cl.
CPC .................. *H04W 72/0446* (2013.01)

(58) Field of Classification Search
CPC ........... H04W 72/044; H04W 72/0446; H04W 72/0453; H04W 72/042; H04W 72/048; H04W 72/0493
USPC ........................................ 370/310, 328, 329
See application file for complete search history.

(56) References Cited

U.S. PATENT DOCUMENTS

| | | | |
|---|---|---|---|
| 8,310,961 B2 | 11/2012 | Chindapol et al. | |
| 9,100,980 B2 * | 8/2015 | Wu et al. | |
| 2011/0268059 A1 * | 11/2011 | Li et al. | 370/329 |
| 2012/0188886 A1 * | 7/2012 | Chen et al. | 370/252 |
| 2012/0195283 A1 * | 8/2012 | Kwon et al. | 370/329 |
| 2012/0250643 A1 * | 10/2012 | He et al. | 370/329 |
| 2013/0022016 A1 * | 1/2013 | Wei | 370/329 |
| 2013/0034018 A1 * | 2/2013 | Wei | 370/254 |
| 2013/0034087 A1 * | 2/2013 | Kwon et al. | 370/336 |
| 2013/0044654 A1 * | 2/2013 | Chen et al. | 370/280 |
| 2013/0077606 A1 * | 3/2013 | Wu et al. | 370/336 |
| 2013/0094456 A1 | 4/2013 | Ng | |
| 2013/0114568 A1 * | 5/2013 | Sagae et al. | 370/332 |
| 2013/0121316 A1 | 5/2013 | Skov et al. | |
| 2013/0242819 A1 * | 9/2013 | He et al. | 370/280 |
| 2013/0301444 A1 * | 11/2013 | Sachs et al. | 370/252 |
| 2013/0301592 A1 * | 11/2013 | Ogawa | 370/329 |
| 2014/0086078 A1 * | 3/2014 | Malladi et al. | 370/252 |
| 2014/0192758 A1 * | 7/2014 | Takeda et al. | 370/329 |
| 2015/0043396 A1 * | 2/2015 | Ekpenyong | 370/280 |
| 2015/0049715 A1 * | 2/2015 | Yerramalli et al. | 370/329 |
| 2015/0085718 A1 * | 3/2015 | Chen et al. | 370/280 |

(Continued)

FOREIGN PATENT DOCUMENTS

WO 2013/085823 A1 6/2013

*Primary Examiner* — Chi H Pham
*Assistant Examiner* — Robert Lopata (57) ABSTRACT

A system and method of allocating communication resources to a wireless device in a wireless communication network are provided. A first subframe configuration can be assigned to a first carrier of a frequency band of an access node. A second subframe configuration different from the first subframe configuration can be assigned to a second carrier of the frequency band. The access node can receive a resource request associated with an application running on the wireless device. An application requirement of the application running on the wireless device can be determined. The wireless device can be instructed to establish communication with the access node over one of the first carrier and the second carrier during a communication session based on the determined application requirement.

20 Claims, 6 Drawing Sheets

(56) References Cited

U.S. PATENT DOCUMENTS

2015/0092629 A1* 4/2015 Seo et al. .............. 370/280
2015/0103703 A1* 4/2015 Zeng et al. ............ 370/280

* cited by examiner

METHOD OF ALLOCATING COMMUNICATION RESOURCES TO A WIRELESS DEVICE IN A WIRELESS COMMUNICATION NETWORK

TECHNICAL BACKGROUND

Wireless communication can be used as a means of accessing a communication network. Wireless communication has certain advantages over wired communications for accessing a network. For example, implementing a wireless interface can eliminate a need for a wired infrastructure thereby reducing the cost of building and maintaining network infrastructure. In addition, a wireless network can support added mobility by allowing a wireless device to access the network from various locations or addresses. A wireless interface can comprise at least one transceiver in active communication with another transceiver that is connected to the network.

Various types of channel access schemes can be used to communicate data over the wireless interface. For example, one type of channel access scheme uses frequency division. Frequency division can provide different frequency bands to different data streams. For example, on one frequency band, all time slots can be available for uplink transmissions and on another frequency band, all time slots can be available for downlink transmissions. In a time division channel access scheme, different time slots are available to different data streams over the same frequency band. Frequency division schemes can provide twice the bandwidth as time division schemes using the same power.

In a wireless network, resources required for uplink transmissions are generally different from resources required for downlink transmissions thus implementing a frequency division scheme can result in unused frequency resources which can undesirably impact transmission in the network. However, coverage and throughput to wireless devices in certain geographical locations within a cell, such as at the cell edge, can be undesirably reduced when time division schemes are implemented due to power limitations.

Overview

A system and method of allocating communication resources to a wireless device in a wireless communication network are provided. A first subframe configuration can be assigned to a first carrier of a frequency band of an access node. A second subframe configuration different from the first subframe configuration can be assigned to a second carrier of the frequency band. The access node can receive a resource request associated with an application running on the wireless device. An application requirement of the application running on the wireless device can be determined. The wireless device can be instructed to establish communication with the access node over one of the first carrier and the second carrier during a communication session based on the determined application requirement.

DETAILED DESCRIPTION

Figure 1:
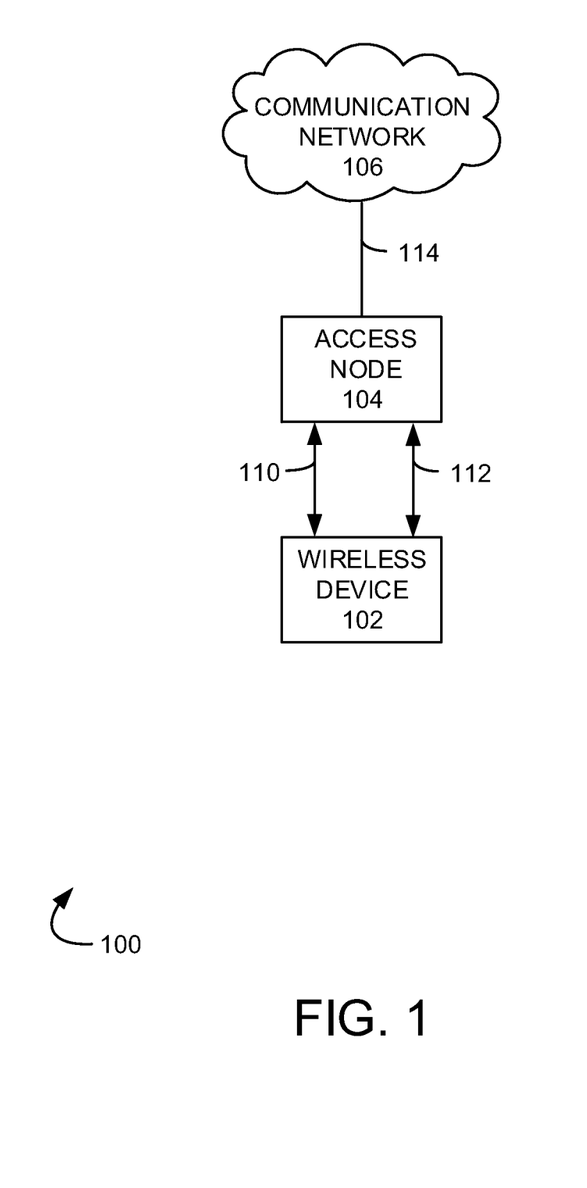
FIG. 1 illustrates a communication system to allocate communication resources in a wireless communication network.

FIG. 1 illustrates an exemplary communication system 100 for scheduling communication in a wireless communication network. Communication system 100 can comprise a wireless device 102, an access node 104, and a communication network 106. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access node 104 and communication network 106, which are omitted for clarity, including additional processing nodes, routers, gateways, and physical and/or wireless data links for carrying data among the various network elements.

Wireless device 102 can be any device configured to communicate over communication system 100 using a wireless interface. For example, wireless device 102 can include a remote terminal unit, a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104, any number of wireless devices can be implemented according to various exemplary embodiments disclosed herein.

The wireless interface of wireless device 102 can include one or more transceivers for transmitting and receiving data over communication system 100. Each transceiver can be associated with the same or different frequency bands, the same or different carriers of the same frequency band, the same or different radio access technologies, the same or different network providers, and/or the same or different services. For example, wireless device 102 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Wireless device 102 can be in communication with access node 104 through communication link 110 and/or through communication link 112. Links 110, 112 can use various communication media, such as air, space, metal, optical fiber, or some other signal propagation path—including combinations thereof. Communication links 110, 112 may comprise many different signals sharing the same link. Communication links 110, 112 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 102 and access node 104 could share the same representative wireless link, but be transferred over different communication sessions, frequencies, timeslots, packets, ports, sockets, logical transport links, or in different directions—including combinations thereof. In an exemplary embodiment, communication link 110 can be associated with a first carrier of a frequency band and communication link 112 can be associated with a second carrier of the frequency band different from the first carrier of the frequency band.

Wireless device 102 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access node 104 can be any network node configured to provide communication between wireless device 102 and communication network 106. Access node 104 can be a standard access nodes or a short range, low power access node. For example, access node 104 can be a macrocell access node such as a base transceiver station, a radio base station, an eNodeB device, or an enhanced eNodeB device, or the like or a short range access node such as a microcell access node, a picocell access node, a femtocell access node, or the like such as a home NodeB or a home eNodeB device. In an exemplary embodiment, access node 104 can communicate over two different carriers of a frequency band. For example, a network operator can split spectrum such that access node 104 can communicate with wireless device 102 over multiple carriers of the frequency band where each carrier is associated with a different subframe configuration.

Access node 104 can comprise a processor and associated circuitry to execute or direct the execution of computer-readable instructions to obtain information. Access node 104 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 104 can receive instructions and other input at a user interface.

Access node 104 can be in communication with communication network 106 through communication link 114. Communication link 114 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Link 114 can be a direct link or might include various equipment, intermediate components, systems, and networks.

Communication network 106 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 106 can be capable of carrying data, for example, to support voice, push-to-talk, broadcast video, and data communications by a wireless device such as wireless device 102. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 can also comprise additional base stations, controller nodes, telephony switches, internet routers, network gateways, computer systems, communication links, or some other type of communication equipment, and combinations thereof.

In operation, a first subframe configuration can be assigned to a first carrier of a frequency band of an access node, such as access node 104. A second subframe configuration different from the first subframe configuration can be assigned to a second carrier of the frequency band. For example, the first carrier can be associated with communication link 110 and the second carrier can be associated with communication link 112. Access node 104 can receive a resource request associated with an application running on a wireless device such as wireless device 102. An application requirement of the application running on wireless device 102 can be determined. Wireless device 102 can be instructed to establish communication with access node 104 over one of the first carrier and the second carrier during a communication session based on the determined application requirement.

Figure 2:
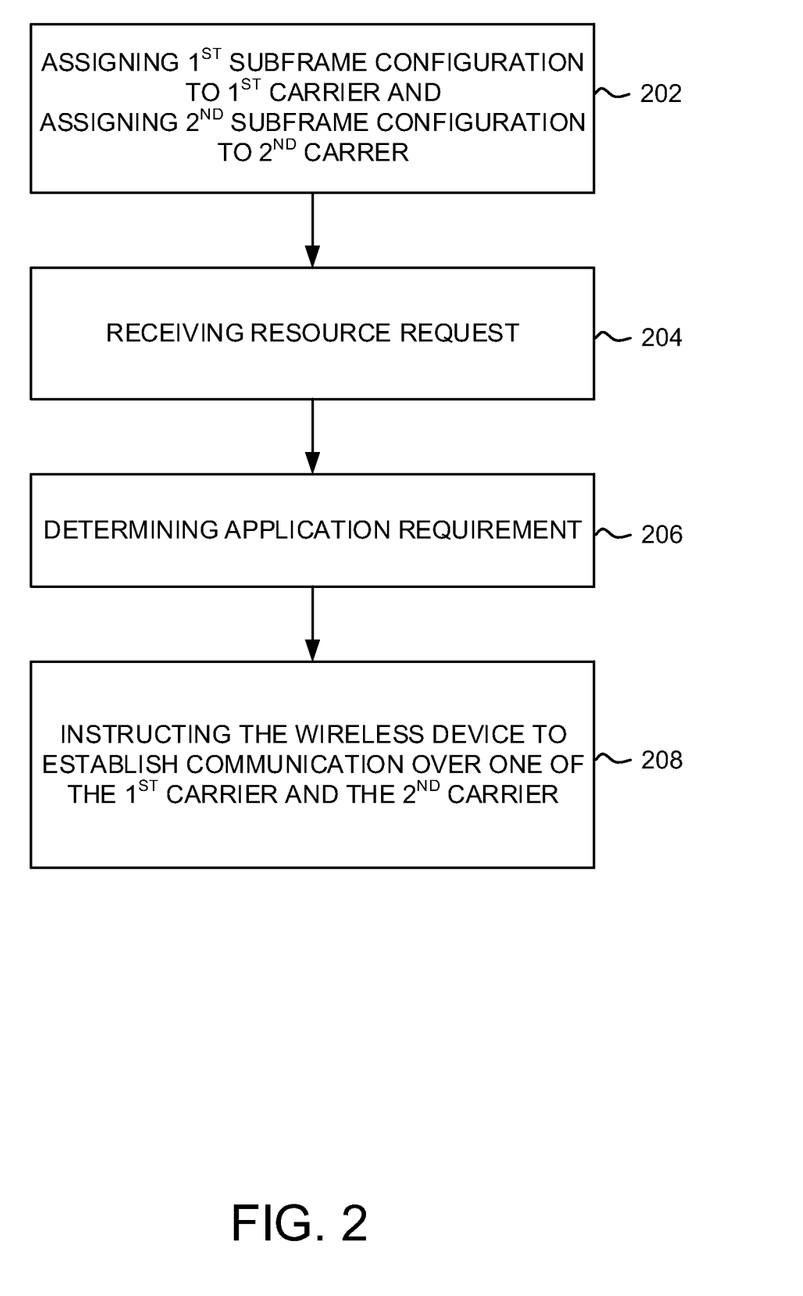
FIG. 2 illustrates an exemplary method of allocating communication resources in a wireless communication network.

FIG. 2 illustrates a flow chart of an exemplary method of allocating communication resources to a wireless device in a wireless communication network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 202, a first subframe configuration can be assigned to a first carrier of a frequency band and a second subframe configuration can be assigned to a second carrier of the frequency band. For example, a network operator can split spectrum into a plurality of carriers within a frequency band. Each carrier can have the same bandwidth or a different bandwidth. A subframe configuration can comprise a number of uplink subframes and a number of downlink subframes. The ratio of uplink to downlink subframes of the first subframe configuration assigned to the first carrier can be different from the ratio of uplink to downlink subframes of the second subframe configuration. In addition, a number of downlink subframes of the first subframe configuration can be greater than a number of downlink subframes of the second subframe configuration and a number of uplink subframes of the first subframe configuration can be less than a number of uplink subframes of the second subframe configuration.

In an exemplary embodiment, a network operator having a frequency band of 20 MHz can deploy a first carrier of, for example, 15 MHz with a subframe configuration that comprises a first ratio of downlink subframes to uplink subframes such that a number of downlink subframes is greater than a number of uplink subframes. The network operator can further deploy a second carrier of, for example, 5 MHz with a subframe configuration that comprises a second ratio of downlink subframes to uplink subframes such that a number of uplink subframes is greater than a number of downlink subframes.

A resource request can be received at 204. For example, access node 104 can receive a resource request associated with an application running on wireless device 102. The resource request can be initiated by the wireless device 102 (e.g., requesting uplink resources) and/or from a network node (e.g., requesting downlink resources). When the resource request is an uplink resource request, the resource request can comprise at least one of an indication of the total amount of resources requested by wireless device 102, an indication of a type of application running on the wireless device 102, an indication of a signal characteristic associated with the first carrier of the frequency band of the access node 104 detected at wireless device 102, and an indication of a signal characteristic associated with the second carrier of the frequency band of the access node 104 detected at wireless device 102. The signal characteristic of the first carrier and/or second carrier can be indicative of a signal quality and/or signal strength. For example, the signal characteristic can be at least one of received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference (SNIR), and signal to quantization noise ratio (SQNR).

When the resource request is a downlink resource request, the resource request can comprise at least one of an indication of the total amount of resources needed to transmit data to wireless device 102, an indication of a type of application running on the wireless device 102, and an indication of network traffic. An indication of network traffic can be based on congestion, traffic flow, round trip delay, etc.

The indication of the type of application running of the wireless device for an uplink resource request and/or a downlink resource request can be based on at least one of a traffic type (e.g. guaranteed bit rate and/or non-guaranteed bit rate), a data packet or traffic flow priority, a maximum permitted data delay (latency), a minimum throughput, a maximum data loss rate, jitter, out-of-order delivery, or the like.

An application requirement can be determined at 206. For example, an application requirement associated with wireless device 102 can be determined by access node 104 based on the resource request. In an exemplary embodiment, the indication of the type of application running on the wireless device can be used to determine the application requirement associated with the application running on wireless device 102.

At 208, the wireless device can be instructed to communicate over one of the first carrier and the second carrier of the frequency band. For example, access node 104 can instruct wireless device 102 to communicate over one of the first carrier 110 and the second carrier 112 of the frequency band. The wireless device can be instructed to communicate over one of the first carrier and the second carrier of the frequency band at the time wireless device 102 establishes connection with access node 104 and/or when a communication session is established between wireless device 102 and access node 104. In an exemplary embodiment, wireless device 102 can be instructed to communicate with a first carrier or a second carrier during a communication session. Alternatively, wireless device 102 can be instructed to switch between the first carrier and the second carrier during the communication session.

In an exemplary embodiment, when the application requirement is determined to require, for example, a high uplink throughput, wireless device 102 can be instructed to communicate over the carrier that has a ratio where there is a lower number of downlink subframes. When the application requirement is determined to require, for example, a low uplink throughout, wireless device 102 can be instructed to communicate over the carrier that has a ratio including a higher number of downlink subframes.

In another exemplary embodiment, the wireless device can be instructed to communicate over one of the first carrier and the second carrier further based on a location of the wireless device. The location of the wireless device 102 can be determined using various methods. For example, the location of the wireless device 102 can be determined based on an indication of signal characteristics associated the first carrier and/or the second carrier monitored at wireless device 102. When the wireless device 102 is determined to be within a cell center, the access node 104 can instruct the wireless device to communicate using the carrier comprising a high downlink ratio subframe configuration. When the wireless device 102 is determined to be within a cell edge, the access node 104 can instruct the wireless device to communicate using the carrier comprising a high uplink ratio subframe configuration.

In another exemplary embodiment, wireless device 102 can be instructed to communicate over the first carrier and/or the second carrier during a communication session based on various factors. For example, wireless device 102 can be instructed to communicate over the first carrier and/or the second carrier based on at least one of a load on the access node 104, a signal characteristic associated with the first carrier, a signal characteristic associated with the second carrier, an indication of mobility associated with the wireless device 102, and a device characteristic of the wireless device 102. The load of the access node can be based on at least one of a total number of wireless devices in communication with the access node, an amount of resources requested by each access node, an application requirement of an application running on the wireless device, etc. The device characteristic of the wireless device can be based various factors associated with the wireless device such as at least one of battery power requirements and/or levels, type and number of antennas, processing capabilities, storage capabilities, current storage usage, etc.

Figure 3:
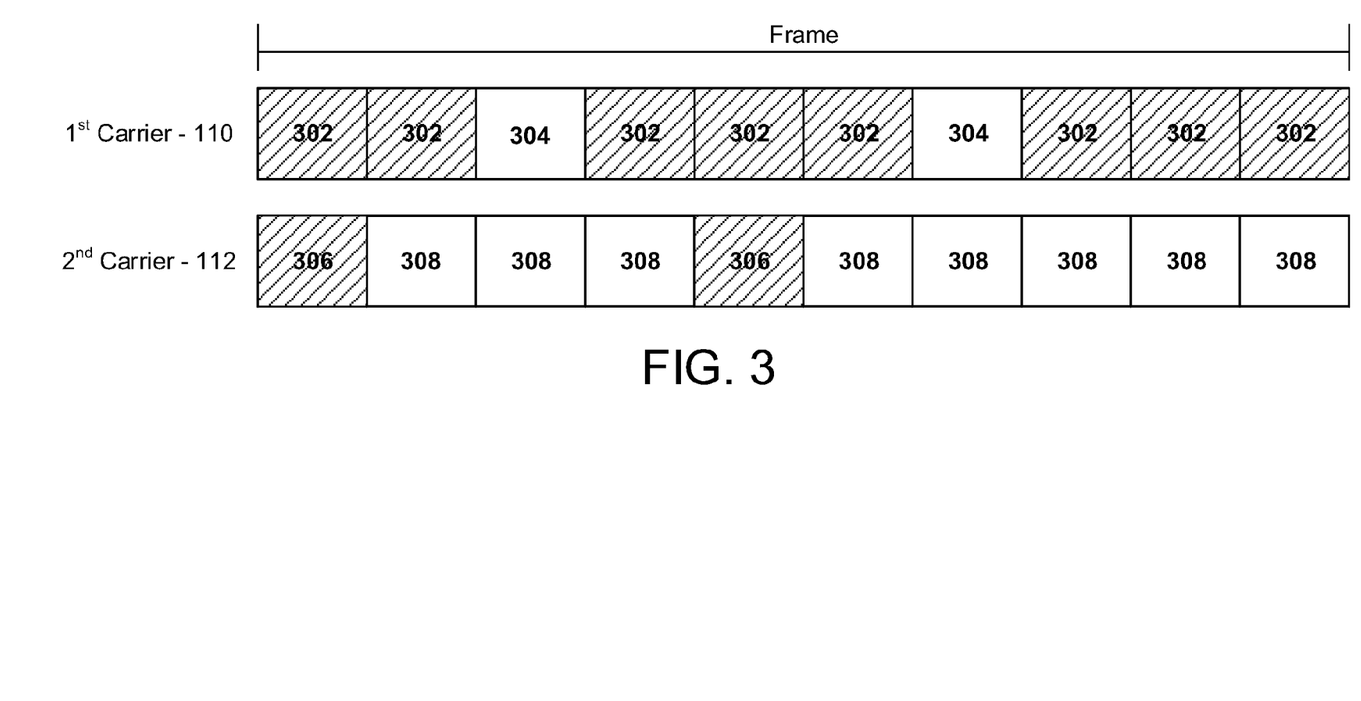
FIG. 3 illustrates exemplary subframe configurations for allocating communication resources in a wireless communication network.

FIG. 3 illustrates exemplary subframe configurations for allocating communication resources in a wireless communication network. In an exemplary embodiment, a subframe configuration can comprise at least one frame having a plurality of subframes. As illustrated in FIG. 3, one frame can comprise ten subframes. However, a frame can comprise any number of subframes. A first subframe configuration associated with a first carrier of a frequency band can be different from a second subframe configuration associated with a second carrier of the frequency band. Each subframe configuration can include at least one uplink subframe and one downlink subframe to allow wireless device 102 to transmit and receive data to the access node 104 during a communication session.

As illustrated in FIG. 3, the first subframe configuration associated with the first carrier 110 of the frequency band can comprise a number of downlink subframes 302 and a number of uplink subframes 304 where the ratio of uplink to downlink subframes results in a higher number of downlink subframes to uplink subframes. The second subframe configuration associated with the second carrier 112 of the frequency band can comprise a number of downlink subframes 306 and a number of uplink subframes 308 where the ratio of uplink to downlink subframes results in a higher number of uplink subframes to downlink subframes.

Figure 4:
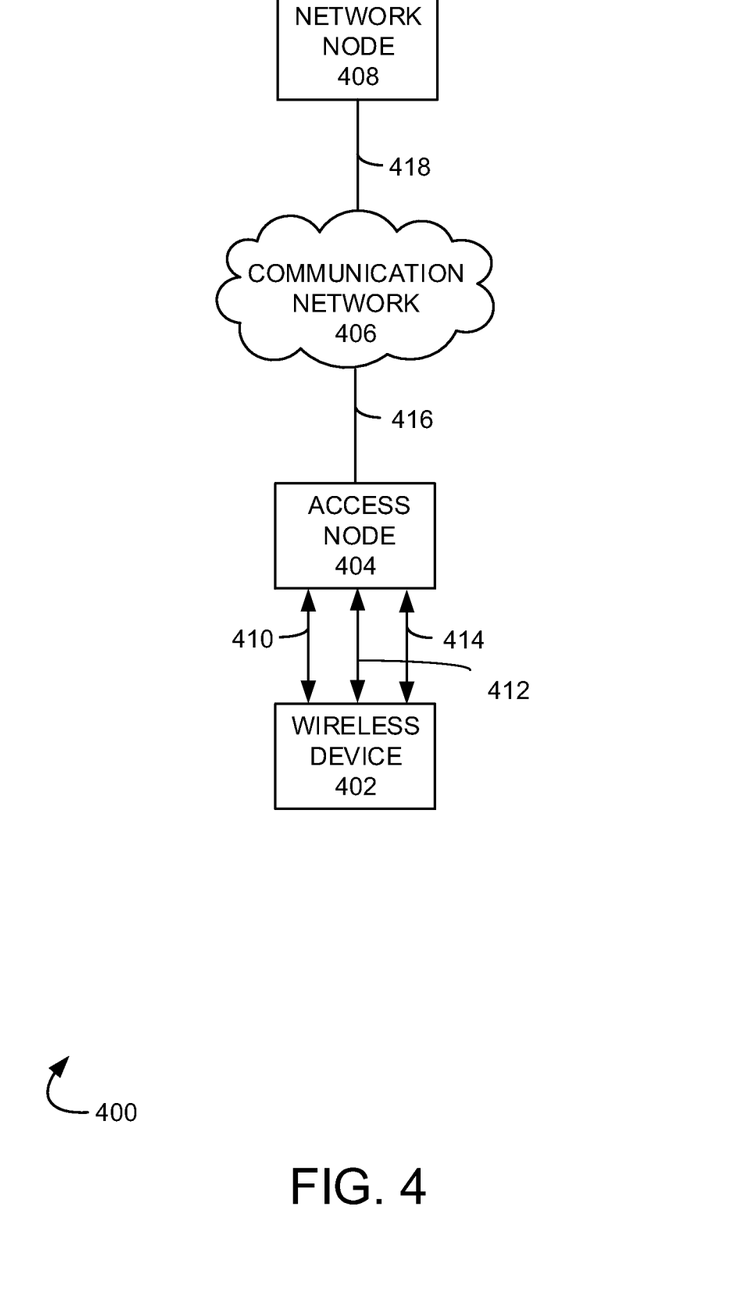
FIG. 4 illustrates another exemplary communication system to allocate communication resources in a wireless communication network.

FIG. 4 illustrates an exemplary communication system 400 for scheduling communication in a wireless communication network. Communication system 400 can comprise a wireless device 402, access node 404, communication network 406, and network node 408. Other network elements may be present in the communication system 400 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access node 404 and communication network 406, which are omitted for clarity, including additional processing nodes, routers, gateways, and physical and/or wireless data links for carrying data among the various network elements.

Wireless device 402 can be any device configured to communicate over communication system 400 using a wireless interface. For example, wireless device 402 can include a remote terminal unit, a cell phone, a smart phone, a computing platform such as a laptop, palmtop, or a tablet, a personal digital assistant, or an internet access device, and combinations thereof. It is noted that while one wireless device is illustrated in FIG. 4 as being in communication with access node 404, any number of wireless devices can be implemented according to various exemplary embodiments disclosed herein.

The wireless interface of wireless device 402 can include one or more transceivers for transmitting and receiving data over communication system 400. Each transceiver can be associated with the same or different frequency bands, the same or different carriers, the same or different radio access technologies, the same or different network providers, and/or the same or different services. For example, wireless device 402 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Wireless device 402 can be in communication with access node 404 through communication link 410, 412, or 414. Links 410, 412, 414 can use various communication media, such as air, space, metal, optical fiber, or some other signal propagation path—including combinations thereof. Communication links 410, 412, 414 may comprise many different signals sharing the same link. Communication links 410, 412, 414 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 402 and access node 404 could share the same representative wireless link, but be transferred over different communication sessions, frequencies, timeslots, packets, ports, sockets, logical transport links, or in different directions—including combinations thereof.

Wireless device 402 can transmit and/or receive information over system 400 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access node 404 can be any network node configured to provide communication between wireless device 402 and communication network 406. Access node 404 can be a standard access nodes or a short range, low power access node. For example, access node 404 can be a macrocell access node such as a base transceiver station, a radio base station, an eNodeB device, or an enhanced eNodeB device, or the like or a short range access node such as a microcell access node, a picocell access node, a femtocell access node, or the like such as a home NodeB or a home eNodeB device. In an exemplary embodiment, access node 404 can communicate over three different carriers of a frequency band. For example, a network operator can split spectrum such that access node 404 can communicate with wireless device 402 over multiple carriers of the frequency band where each carrier is associated with a different subframe configuration.

Access node 404 can comprise a processor and associated circuitry to execute or direct the execution of computer-readable instructions to obtain information. Access node 404 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 404 can receive instructions and other input at a user interface.

Network node 408 can be any network node configured to receive uplink data from wireless device 402 or transmit downlink data to wireless device 402. Network node 408 can be a standalone computing device, computing system, or network component, and can be accessible, for example, by a wired or wireless connection, or through an indirect connection such as through a computer network or communication network. Alternatively, network node 408 can be integrated into any other network node in system 400. Network node 408 can be operated by the same network operator or different network operators. For example, network node 408 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, a serving gateway (SGW), a public data network gateway (PGW), a destination wireless device, etc.

Access node 404 can be in communication with communication network 406 through communication link 416. Network node 408 can be in communication with communication network 406 through communication link 418. Communication links 416, 418 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 416, 418 can be a direct link or might include various equipment, intermediate components, systems, and networks.

Communication network 406 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 406 can be capable of carrying data, for example, to support voice, push-to-talk, broadcast video, and data communications by a wireless device such as wireless device 402. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 406 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 406 can also comprise additional base stations, controller nodes, telephony switches, internet routers, network gateways, computer systems, communication links, or some other type of communication equipment, and combinations thereof.

In operation, a first subframe configuration can be assigned to a first carrier 410 of a frequency band of an access node 404, a second subframe configuration different from the first subframe configuration can be assigned to a second carrier 412 of the frequency band, and a third subframe configuration different from the first carrier and/or the second carrier can be assigned to a third carrier 414 of the frequency band. The access node 404 can receive a resource request associated with an application running on the wireless device 402. An application requirement of the application running on the wireless device can be determined. The wireless device can be instructed to establish communication with the access node 404 over one of the first carrier, the second carrier, and/or the third carrier during a communication session based on the determined application requirement.

In an exemplary embodiment, the first subframe configuration can comprise a first ratio of downlink subframes to uplink subframes and the second subframe configuration can comprise a second ratio of downlink subframes to uplink subframes where a number of downlink subframes of the first subframe configuration is greater than a number of downlink subframes of the second subframe configuration. The third subframe configuration can comprise a different ratio of uplink to downlink subframes. For example, the third subframe configuration can comprise an equal number of downlink subframes and uplink subframes. In addition, the first carrier can comprise a first bandwidth, the second carrier can comprise a second bandwidth different from the first carrier, and the third carrier can comprise a third bandwidth different from at least one of the first carrier and the second carrier. Wireless device 402 can be instructed to communicate over the first carrier, the second carrier, and/or the third carrier during a communication session based on the application requirement of the application running on the wireless device 402.

Figure 5:
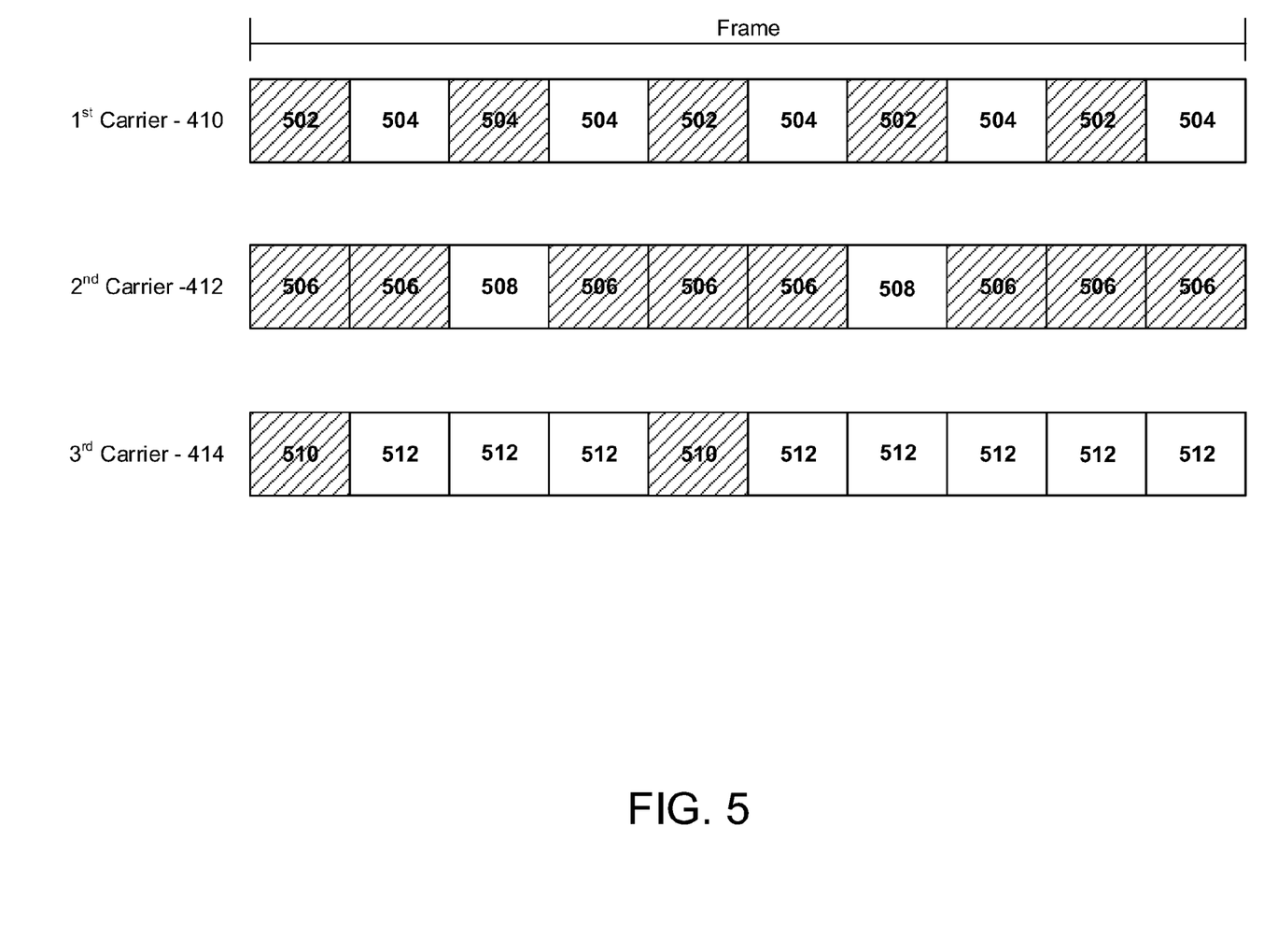
FIG. 5 illustrates other exemplary subframe configurations for allocating communication resources in a wireless communication network.

FIG. 5 illustrates exemplary subframe configurations for allocating communication resources in a wireless communication network. In an exemplary embodiment, a subframe configuration can comprise at least one frame having a plurality of subframes. As illustrated in FIG. 5, one frame can comprise ten subframes. However, a frame can comprise any number of subframes. A first subframe configuration associated with a first carrier of a frequency band can be different from a second subframe configuration associated with a second carrier of the frequency band and a third subframe configuration associated with a third carrier of the frequency band can be different from the first subframe configuration and/or the second subframe configuration. Each subframe configuration can include at least one uplink subframe and one downlink subframe to allow wireless device 402 to transmit to and receive data from the access node 404 during a communication session.

As illustrated in FIG. 5, the first subframe configuration associated with the first carrier 410 of the frequency band can comprise an even number of downlink subframes 502 and uplink subframes 504. The second subframe configuration associated with the second carrier 412 of the frequency band can comprise a number of downlink subframes 506 and a number of uplink subframes 508 where the ratio of uplink to downlink subframes results in a greater number of downlink subframes than uplink subframes. The third subframe configuration associated with the third carrier of the frequency band can comprise a number of downlink subframes 510 and a number of uplink subframes 512 where the ratio of uplink to downlink subframes results in a greater number of uplink subframes than downlink subframes.

Wireless device 402 can be instructed to communicate over the first carrier, the second carrier, and/or the third carrier during a communication session based on at least one of a location of the wireless device 402, a load of the access node 404, a signal characteristic associated with the first carrier, a signal characteristic associated with the second carrier, a signal characteristic associated with the third carrier, an indication of mobility associated with the wireless device, and a device characteristic of the wireless device.

Figure 6:
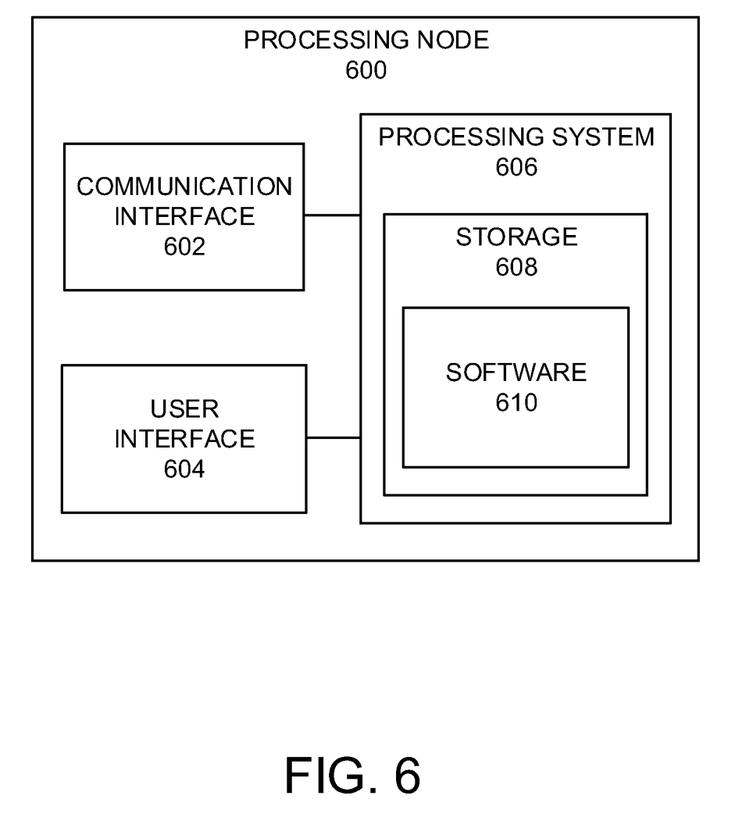
FIG. 6 illustrates a processing node according to an exemplary embodiment.

FIG. 6 illustrates an exemplary processing node 600 in a communication system. Processing node 600 comprises communication interface 602, user interface 604, and processing system 606 in communication with communication interface 602 and user interface 604. Processing node 600 is capable of monitoring communications in a communication network. Processing system 606 includes storage 608, which can comprise a disk drive, flash drive, memory circuitry, or other memory device. Storage 608 can store software 610 which is used in the operation of the processing node 600. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 104, 404 and network node 408. Processing node 600 can also be an adjunct or component of a network element, such as an element of access nodes 104, 404 and network node 408. Processing node 400 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of allocating communication resources to a wireless device in a wireless communication network, comprising:
   assigning a first subframe configuration to a first carrier of a frequency band of an access node and assigning a second subframe configuration different from the first subframe configuration to a second carrier of the frequency band;
   receiving at the access node a resource request associated with an application running on the wireless device;
   determining an application requirement and associated throughput of the application running on the wireless device; and
   when the application requirement is determined to require a high uplink throughput, instructing the wireless device to communicate with the access node over the first carrier of the frequency band of the access node, wherein the first subframe configuration of the first carrier comprises a lower number of downlink subframes than the second subframe configuration of the second carrier.

2. The method of claim 1, wherein the first carrier comprises a first bandwidth and the second carrier comprises a second bandwidth different from the first bandwidth of the first carrier.

3. The method of claim 1, wherein the first subframe configuration comprises a first ratio of downlink subframes to uplink subframes and the second subframe configuration comprises a second ratio of downlink subframes to uplink subframes, wherein a number of downlink subframes of the second subframe configuration is greater than a number of downlink subframes of the first subframe configuration.

4. The method of claim 3, further comprising:
   assigning a third subframe configuration to a third carrier of the frequency band, wherein the third subframe configuration comprises an equal number of downlink subframes and uplink subframes.

5. The method of claim 4, wherein the first carrier comprises a first bandwidth, the second carrier comprises a second bandwidth different from the first carrier, and the third carrier comprises a third bandwidth different from at least one of the first carrier and the second carrier.

6. The method of claim 1, wherein the application requirement is determined in response to a message received at the access node from the wireless device.

7. The method of claim 1, wherein the application requirement is determined in response to a message received at the access node from a network node.

8. The method of claim 1, wherein the wireless device is instructed to switch between communicating with the access node over the first carrier and the second carrier during a communication session.

9. The method of claim 1, further comprising determining a location of the wireless device, wherein the wireless device is instructed to communicate over one of the first carrier and the second carrier based on the application requirement and the location of the wireless device.

10. The method of claim 1, wherein instructing the wireless device to communicate over one of the first carrier and the second carrier is further based on at least one of a load of the access node, a signal characteristic associated with the first carrier, a signal characteristic associated with the second carrier, an indication of mobility associated with the wireless device, and a device characteristic of the wireless device.

11. A system for allocating communication resources to a wireless device in a wireless communication network, comprising:
    a processing node configured to:
        assign a first subframe configuration to a first carrier of a frequency band of an access node and assign a second subframe configuration different from the first subframe configuration to a second carrier of the frequency band;
        receive a resource request associated with an application running on the wireless device;

determine an application requirement and associated throughput of the application running on the wireless device; and when the application requirement is determined to require a low uplink throughput, instruct the wireless device to communicate with the access node over the first carrier of the frequency band of the access node wherein the first subframe configuration of the first carrier comprises a greater number of downlink subframes than the second subframe configuration of the second carrier.

12. The system of claim 11, wherein the first carrier comprises a first bandwidth and the second carrier comprises a second bandwidth different from the first bandwidth of the first carrier.

13. The system of claim 11, wherein the first subframe configuration comprises a first ratio of downlink subframes to uplink subframes and the second subframe configuration comprises a second ratio of downlink subframes to uplink subframes, wherein a number of downlink subframes of the second subframe configuration is greater than a number of downlink subframes of the first subframe configuration.

14. The system of claim 13, wherein the processing node is further configured to:

assign a third subframe configuration to a third carrier of the frequency band, wherein the third subframe configuration comprises an equal number of downlink subframes and uplink subframes.

15. The system of claim 14, wherein the first carrier comprises a first bandwidth, the second carrier comprises a second bandwidth different from the first carrier, and the third carrier comprises a third bandwidth different from at least one of the first carrier and the second carrier.

16. The system of claim 11, wherein the application requirement is determined in response to a message received at the access node from the wireless device.

17. The system of claim 11, wherein the application requirement is determined in response to a message received at the access node from a network node.

18. The system of claim 11, wherein the wireless device is instructed to switch from communicating with the access node over the first carrier to communicating with the access node over the second carrier during a communication session.

19. The system of claim 11, wherein the processing node is further configured to determine a location of the wireless device, wherein the wireless device is instructed to communicate over one of the first carrier and the second carrier based on the application requirement and the location of the wireless device.

20. The system of claim 11, wherein the wireless device is instructed to communicate over one of the first carrier and the second carrier further based on at least one of a load of the access node, a signal characteristic associated with the first carrier, a signal characteristic associated with the second carrier, an indication of mobility associated with the wireless device, and a device characteristic of the wireless device.

* * * * *